US 9,794,316 B2

(12) United States Patent
Dong

(10) Patent No.: US 9,794,316 B2
(45) Date of Patent: Oct. 17, 2017

(54) METHOD AND SYSTEM FOR CONTENT MANAGEMENT

(71) Applicant: ZTE Corporation, Shenzhen (CN)

(72) Inventor: Li Dong, Shenzhen (CN)

(73) Assignee: XI'AN ZHONGXING NEW SOFTWARE CO. LTD, Xi'An (CN)

( * ) Notice: Subject to any disclaimer, the term of this patent is extended or adjusted under 35 U.S.C. 154(b) by 148 days.

(21) Appl. No.: 14/422,489

(22) PCT Filed: Aug. 27, 2013

(86) PCT No.: PCT/CN2013/082398
§ 371 (c)(1),
(2) Date: Apr. 7, 2015

(87) PCT Pub. No.: WO2014/032575
PCT Pub. Date: Mar. 6, 2014

(65) Prior Publication Data
US 2015/0237098 A1 Aug. 20, 2015

(30) Foreign Application Priority Data
Aug. 27, 2012 (CN) .......................... 2012 1 0307907

(51) Int. Cl.
G06F 15/16 (2006.01)
H04L 29/06 (2006.01)
(Continued)

(52) U.S. Cl.
CPC .......... *H04L 65/601* (2013.01); *H04L 47/762* (2013.01); *H04L 65/4084* (2013.01); *H04L 67/1095* (2013.01)

(58) Field of Classification Search
CPC ............... H04L 65/601; H04L 67/1095; H04L 65/4084; H04L 47/762; H04L 29/06;
(Continued)

(56) References Cited

U.S. PATENT DOCUMENTS 5,926,649 A * 7/1999 Ma .......................... G06F 9/4887
710/6
8,489,811 B1 * 7/2013 Corbett ............. G06F 17/30233
707/827
(Continued)

FOREIGN PATENT DOCUMENTS

CN 101594292 A 12/2009
CN 102096722 A 6/2011
(Continued)

OTHER PUBLICATIONS

International Search Report for corresponding application PCT/CN2013/082398 filed Aug. 27, 2013; Mail date Dec. 5, 2013.
(Continued)

Primary Examiner — Cheikh Ndiaye
(74) Attorney, Agent, or Firm — Cantor Colburn LLP

(57) ABSTRACT

Disclosed are a method and a system for content management, the method comprises: a master control server allocates, for contents to be issued, one or more merged file blocks and a storage location of each content in its corresponding merged file block according to a received content issue request, and sends to a media storage-and-forward server a content download request containing one or more names of the one or more merged file block and the storage location of each content; the media storage-and-forward server downloads the content to be issued according to the content download request, and stores each downloaded content in the corresponding storage location of the corresponding merged file block. The solutions save the storage space of the file system, improve the storage efficiency of the file system, and reduce the storage cost of the file system.

10 Claims, 4 Drawing Sheets

(51) Int. Cl.
*H04L 29/08* (2006.01)
*H04L 12/923* (2013.01)

(58) Field of Classification Search
CPC ..... H04L 12/923; H04L 29/08; H04N 21/231; H04N 21/2315
See application file for complete search history.

(56) References Cited

U.S. PATENT DOCUMENTS

| | | | | |
|---|---|---|---|---|
| 2002/0162047 | A1* | 10/2002 | Peters | G06F 11/1076 714/5.1 |
| 2003/0005457 | A1* | 1/2003 | Faibish | H04N 7/17336 725/94 |
| 2004/0236826 | A1 | 11/2004 | Harville | |
| 2005/0010671 | A1 | 1/2005 | Grannan | |
| 2010/0011003 | A1* | 1/2010 | Carver | H04L 67/06 707/E17.01 |

FOREIGN PATENT DOCUMENTS

| | | |
|---|---|---|
| CN | 102624866 A | 8/2012 |
| CN | 102833581 A | 12/2012 |

OTHER PUBLICATIONS

European Search Report for corresponding application EP 13 83 3790; Report dated Sep. 29, 2015.

* cited by examiner

METHOD AND SYSTEM FOR CONTENT MANAGEMENT

TECHNICAL FIELD

The disclosure relates to the communication field, and in particular to a method and a system for content management.

BACKGROUND

Personalized interactive television or Internet Protocol Television (IPTV) is a broadband cable TV network. The broadband cable TV network integrates various technologies such as the Internet, multimedia and communications to provide a new technology of multiple interactive services including a digital TV to a user. The broadband cable TV network can adapt to the trend of rapid development of the network very well, and effectively utilizes multiple types of network resources. A content distribution system is a system in which an IPTV system is applied to a mobile terminal. With the rapid development of content distribution network service, how to improve the storage utilization rate and service utilization rate of the system becomes a key factor influencing service deployment.

In the related art, in a content distribution network system, one content is generally stored in a way of one media file, two index files and three catalogue files in a distributed file system. For this storage way, one content may occupy multiple file blocks in the file system, but the content distribution network system is widely applied to the mobile terminal, which has rich video content and low code rate, and the file to be stored is generally within the range from several Megabytes (MBs) to several tens of MBs. Since there are a large number of files which occupy many files and file blocks in the distributed file system, the file system is quite low in storage efficiency and high in cost.

SUMMARY

The embodiments of the disclosure provide a method and a system for content management, so as to solve the problem in the related art that the storage manner adopted in a content delivery network system wastes the storage space of the file system, and the file system has low storage efficiency and high cost.

The method for content management according to an embodiment of the disclosure includes:

a master control server allocating, for contents to be issued, one or more merged file blocks and a storage location of each content in its corresponding merged file block according to a received content issue request, and sending to a media storage-and-forward server a content download request containing one or more names of the one or more merged file blocks and the storage location of each content; and the media storage-and-forward server downloading the contents to be issued according to the content download request, and storing each downloaded content in the corresponding storage location of the corresponding merged file block.

In an example embodiment, a plurality of merged file blocks are provided in a file system storage component of the media storage-and-forward server, and each merged file block is capable of storing one or more contents; a content management table is maintained in the master control server and the content management table records an available storage space value of each merged file block of the plurality of merged file blocks.

In an example embodiment, the content issue request includes the number of contents to be issued and a capacity size of each content;

the master control server allocating, for the contents to be issued, the one or more merged file blocks and the storage location of each content in its corresponding merged file block according to the received content issue request includes:

the master control server, allocating, for the content to be issued, the merged file blocks and the storage location of each content in its corresponding merged file block according to the number of contents to be issued, the capacity size of each content, and the content management table maintained by the master control server.

In an example embodiment, the content download request contains an identifier of each content to be issued and a issue path of each content to be issued;

the media storage-and-forward server downloading the content to be issued according to the content download request includes:

the media storage-and-forward server downloading each content to be issued from a target server according to the identifier and the issue path of the content to be issued in the content download request.

In an example embodiment, after the media storage-and-forward server storing the downloaded content in the corresponding storage location of the corresponding merged file block, the method further includes:

the master control server obtaining a name of the merged file block corresponding to a selected content and the storage location of the selected content in the merged file block according to a received content-on-demand request, and sending to the media storage-and-forward server a content-on-demand command containing the name of the merged file block and the storage location of the selected content in the merged file block; and the media storage-and-forward server searching for the corresponding merged file block according to the content-on-demand command, reading the selected content from the corresponding storage location in the merged file block, and transmitting a corresponding media code stream to implement content-on-demand.

The system for content management according to the disclosure includes:

a master control server, is configured to allocate, for contents to be issued, one or more merged file blocks and a storage location of each content in its corresponding merged file block according to a received content issue request, and send to a media storage-and-forward server a content download request containing one or more names of the one or more merged file block and the storage location of each content; and the media storage-and-forward server, is configured to download the content to be issued according to the content download request, and store each downloaded content in the corresponding storage location of the corresponding merged file block.

In an example embodiment, the media storage-and-forward server includes a file system storage component, a plurality of merged file blocks are provided in the file system storage component, each merged file block is capable of storing one or more contents; a content management table is maintained in the master control server and the content management table is configured to record an available storage space value of each merged file block of the plurality of merged file blocks.

In an example embodiment, the content issue request includes the number of contents to be issued and a capacity size of each content;

the master control server is further configured to allocate, for the contents to be issued, the one or more merged file blocks and the storage location of each content in its corresponding merged file block according to the number of contents to be issued, the capacity size of each content, and the content management table maintained by the master control server.

In an example embodiment, the content download request contains an identifier of each content to be issued and a issue path of each content to be issued;

the media storage-and-forward server is configured to download each content to be issued from a target server according to the identifier and the issue path of each content to be issued in the content download request.

In an example embodiment, the master control server is further configured to obtain a name of the merged file block corresponding to a selected content and the storage location of the selected content in the merged file block according to a received content-on-demand request, and send to the media storage-and-forward server a content-on-demand command containing the name of the merged file block and the storage location of the selected content in the merged file block; and the media storage-and-forward server is further configured to search the corresponding merged file block according to the content-on-demand command, read the selected content from the corresponding storage location in the merged file block, and transmit a corresponding media code stream to implement content-on-demand.

The method and system for content management according to the disclosure store a plurality of small capacity contents respectively in different positions of the corresponding merged file blocks in the file system storage component, thus saving the storage space of the file system, improving the storage efficiency of the file system, and reducing the storage cost of the file system.

The achievement of the goal, functional features and advantages of the disclosure will be described hereinafter in detail with reference to the drawings in conjunction with the embodiments.

DETAILED DESCRIPTION OF EMBODIMENTS

It should be noted that the specific embodiments described here are only to illustrate the disclosure, but not to limit the disclosure.

Figure 1:
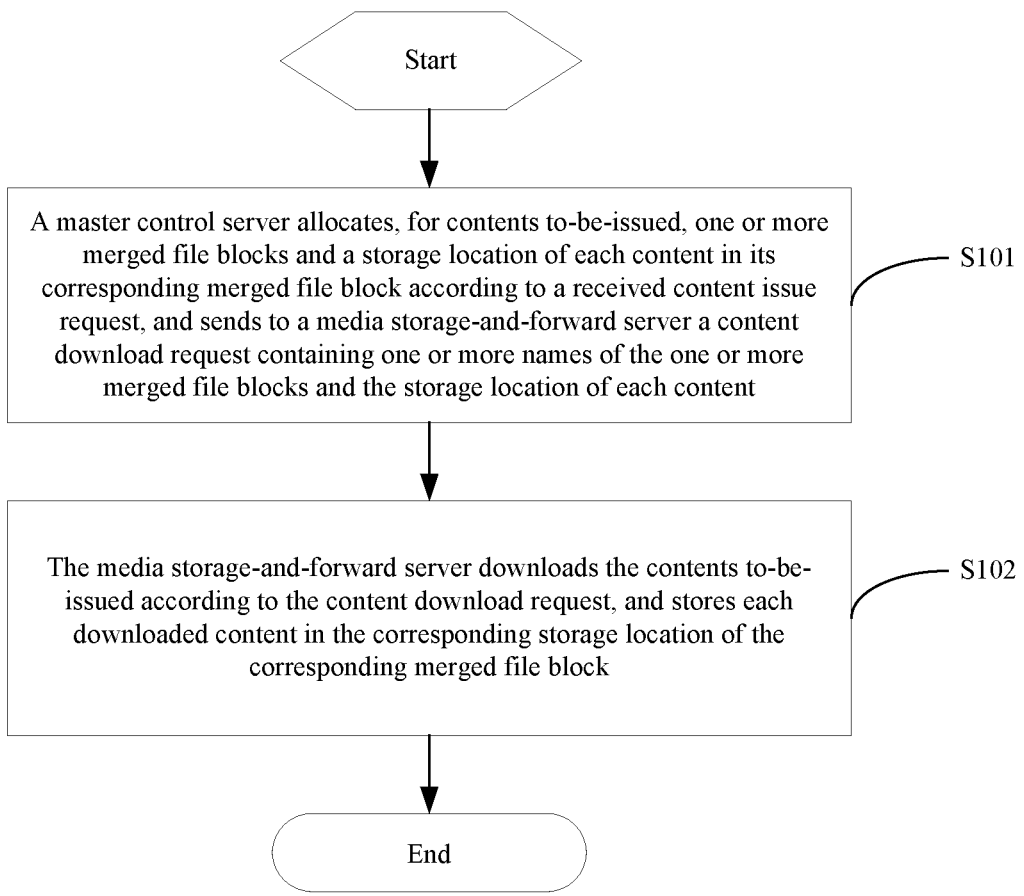
FIG. 1 is a flowchart of a method for content management according to an embodiment of the disclosure.

As shown in FIG. 1, there is provided a method for content management according to an embodiment of the disclosure, comprising:

Step S101: A master control server allocates, for contents to be issued, one or more merged file blocks and a storage location of each content in its corresponding merged file block according to a received content issue request, and sends to a media storage-and-forward server a content download request containing one or more names of the one or more merged file blocks and the storage location of each content.

In the embodiment, the content issue request is sent by a media positioning service system. That is, when the content is needed to be issued, a user inputs a content issue instruction through a human-computer interaction interface of the media positioning service system, and then the media positioning service system generates a content issue request including the number of contents to be issued and a capacity size of each content according to the above content issue instruction. A plurality of merged file blocks are provided in a file system storage component of the media storage-and-forward server, each merged file block may store one or more contents; the master control server maintains a content management table which records an available storage space value of each merged file block of the plurality of merged file blocks.

In Step S101, the master control server allocates, for the contents to be issued the one or more merged file blocks and the storage location of each content in its corresponding merged file block according to a received content issue request includes: the master control server allocates, for the content to be issued, the merged file block and the storage location of each content in its corresponding merged file block according to the number of contents to be issued, the capacity size of each content, and the content management table maintained by the master control server.

Step S102: The media storage-and-forward server downloads the contents to be issued according to the content download request, and stores each downloaded content in the corresponding storage location of the corresponding merged file block.

In an example embodiment, the content issue request contains an identifier of each content to be issued and a issue path of each content to be issued. The media storage-and-forward server downloads the content to be issued according to the content download request includes: the media storage-and-forward server downloads each content to be issued from a target server according to the identifier and the issue path of each content to be issued in the content download request.

Figure 2:
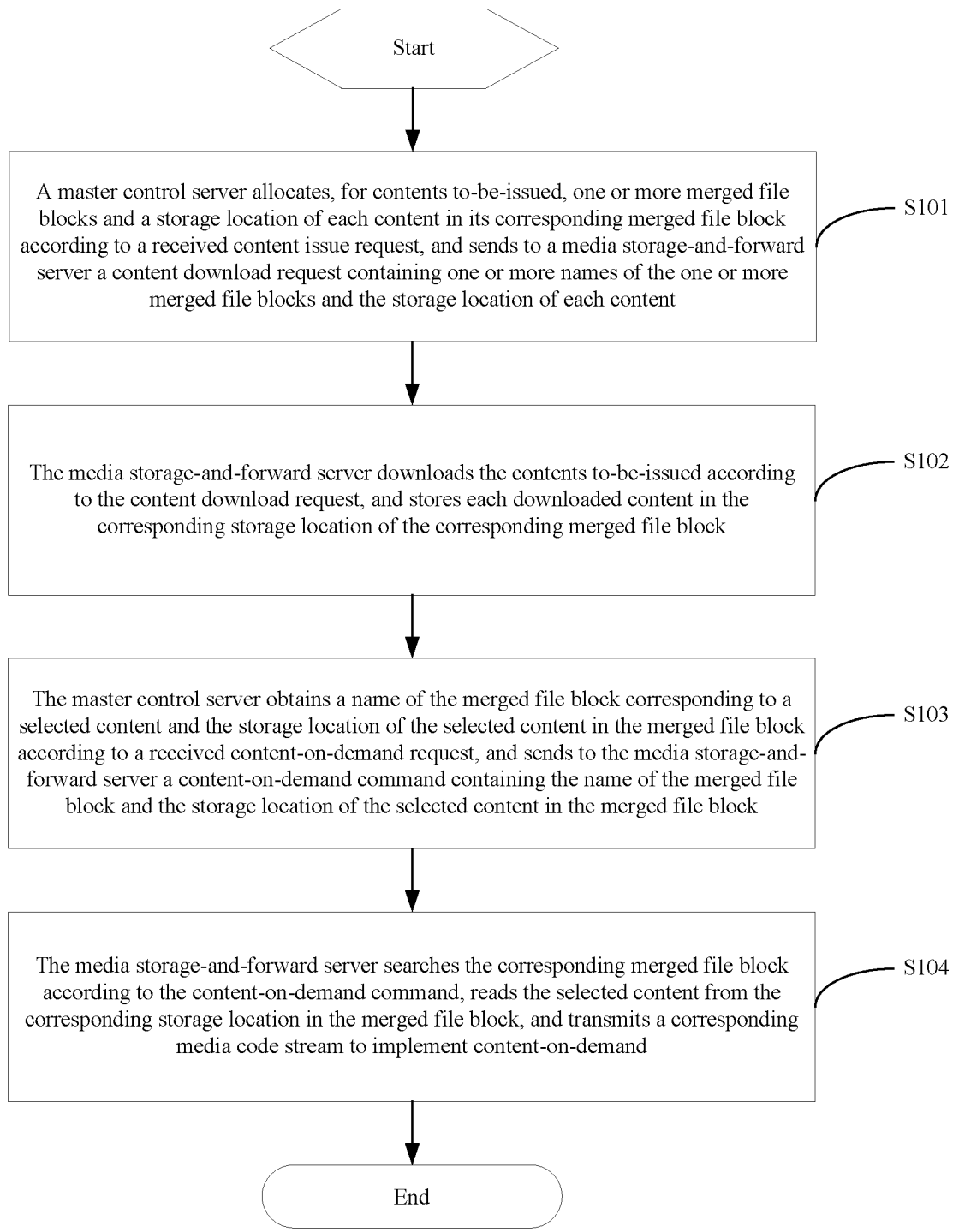
FIG. 2 is a flowchart of a method for content management according to another embodiment of the disclosure.

As shown in FIG. 2, there is provided a method for content management according to another embodiment of the disclosure. Based on the above embodiments, after the media storage-and-forward server stores the downloaded content in the corresponding storage location in the corresponding merged file block, the method further includes:

Step S103: The master control server obtains a name of the merged file block corresponding to a selected content and the storage location of the selected content in the merged file block according to a received content-on-demand request, and sends to the media storage-and-forward server a content-on-demand command containing the name of the merged file block and the storage location of the selected content in the merged file block.

In Step S103, the content-on-demand request is sent by a user terminal. That is, when the user needs to broadcast some content, the content-on-demand request is input through the human-computer interaction interface of the user terminal. The user terminal transmits the content-on-demand request to the master control server after receiving the content-on-demand request.

In Step S103, the content-on-demand request contains the name of the selected content, the master control server, after receiving the content-on-demand request, searches for the corresponding merged file block of the content in the media storage-and-forward server and the storage location in the merged file block from the content management table, then adds the searched relevant information to the content-on-demand command, and transmits the content-on-demand command to the media storage-and-forward server.

Step S104: The media storage-and-forward server searches the corresponding merged file block according to the content-on-demand command, reads the selected content from the corresponding storage location in the merged file block, and transmits a corresponding media code stream to implement content-on-demand.

In the embodiment of the method for content management above, a plurality of small capacity contents are respectively stored in different positions of the corresponding merged file blocks in the file system storage component, thus saving the storage space of the file system, improving the storage efficiency of the file system, and reducing the storage cost of the file system.

Figure 3:
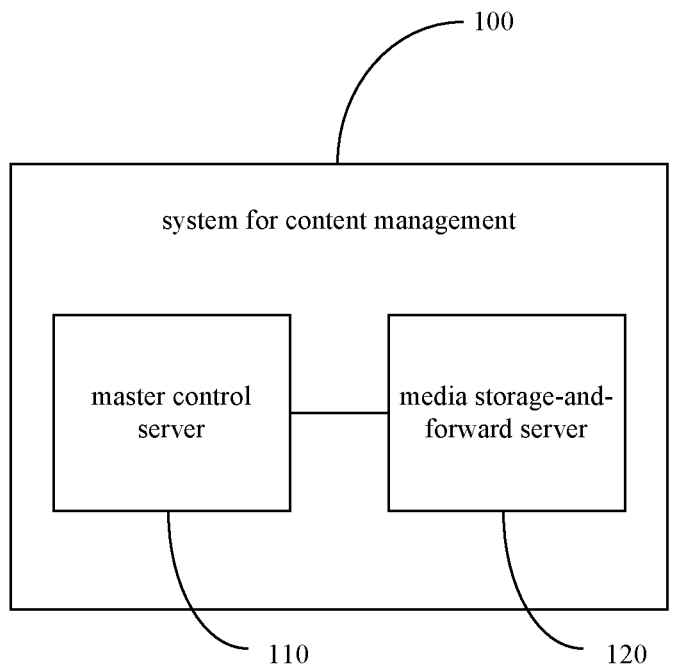
FIG. 3 is a structural diagram of a system for content management according to an embodiment of the disclosure.

As shown in FIG. 3, there is provided a system 100 for content management according to an embodiment of the disclosure, including: a master control server 110 and a media storage-and-forward server 120. The master control server 110 is configured to allocate, for contents to be issued, one or more merged file blocks and a storage location of each content in its corresponding merged file block according to a received content issue request, and sends to a media storage-and-forward server 120 a content download request containing one or more names of the one or more merged file block and the storage location of each content. The media storage-and-forward server 120 is configured to download the content to be issued according to the content download request, and store each downloaded content in the corresponding storage location of the corresponding merged file block.

Figure 4:
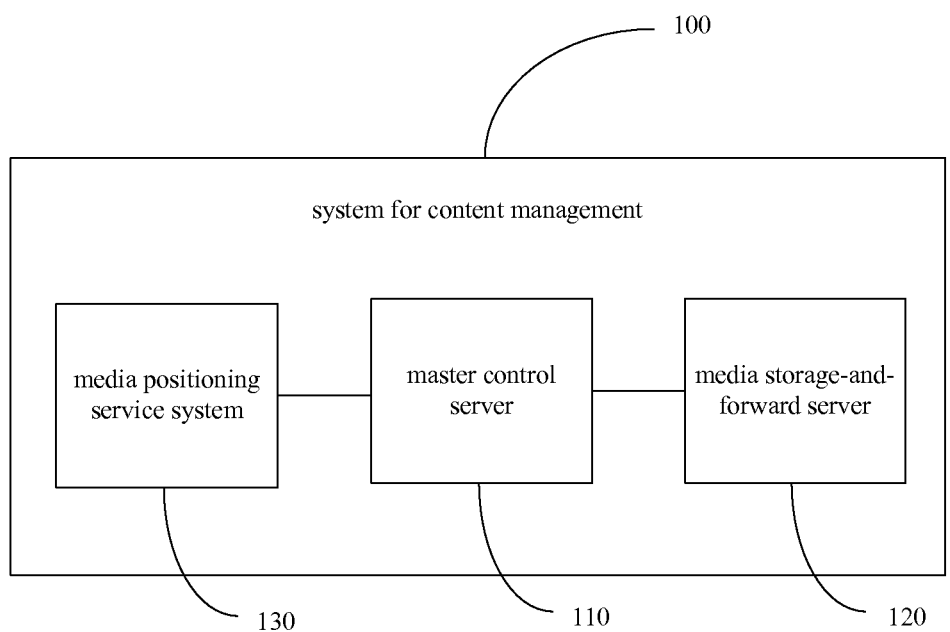
FIG. 4 is a structural diagram of a system for content management according to another embodiment of the disclosure.

As shown in FIG. 4, the system 100 for content management further includes a media positioning service system 130. The media positioning service system 130 is configured to transmit the content issue request to the master control server, that is, the content issue request is sent by the media positioning service system 130. In the embodiment, when the content is needed to be issued, a user inputs a content issue instruction through a human-computer interaction interface of the media positioning service system 130, and then the media positioning service system 130 generates a content issue request including the number of contents to be issued and a capacity size of each content according to the above content issue instruction, and transmits the content issue request to the master control server 110.

Figure 5:
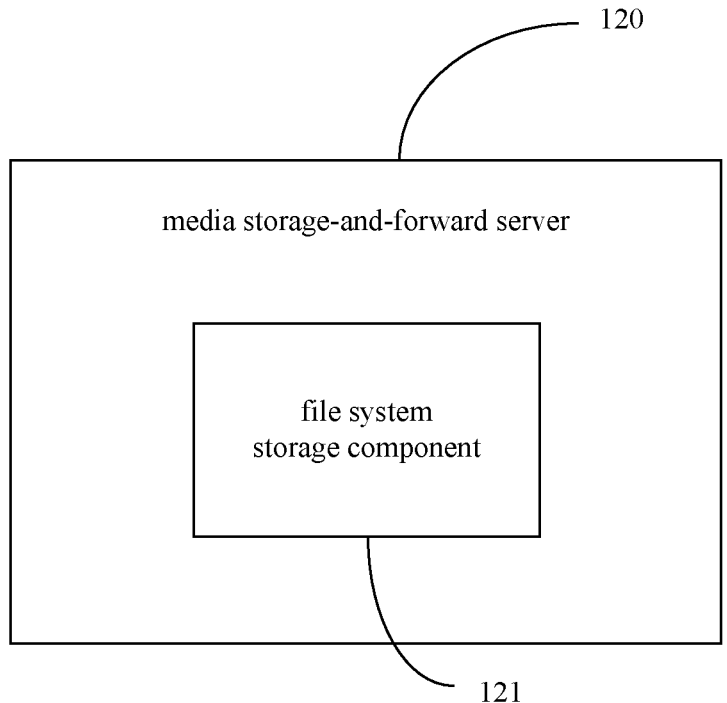
FIG. 5 is a structural diagram of a media storage and forwarding server in a system for content management according to the disclosure.

Further, as shown in FIG. 5, the media storage-and-forward server 120 includes a file system storage component 121, a plurality of merged file blocks are provided in the file system storage component 121, and each merged file block is capable storing one or more contents. The master control server 110 maintains a content management table which is configured to record an available storage space of each merged file block of the plurality of merged file blocks.

Further, in the embodiment of the system 100 for content management, the content issue request includes the number of contents to be issued and the capacity size of each content. The master control server 110 allocates, for the contents to be issued, the one or more merged file blocks and the storage location of each content in its corresponding merged file block according to the number of contents to be issued, the capacity size of each content, and the content management table maintained by the master control server.

Further, in the embodiment of the system 100 for content management, the content download request contains an identifier of each content to be issued and a issue path of each content to be issued. The media storage-and-forward server 120 is configured to download each content to be issued from a target server according to the identifier and the issue path of the content to be issued in the content download request.

Further, in the embodiment of the system 100 for content management, the master control server 110 is also configured to obtain a name of the merged file block corresponding to a selected content and the storage location of the selected content in the merged file block according to a received content-on-demand request, and send to the media storage-and-forward server 120 a content-on-demand command containing the name of the merged file block and the storage location. The content-on-demand request contains the name of the merged file block and the storage location of the selected content in the merged file block, the master control server 110, after receiving the content-on-demand request, searches for the corresponding merged file block of the content in the media storage-and-forward server 120 and the storage location in the merged file block from the content management table, then adds the searched relevant information to the content-on-demand command, and transmits the content-on-demand command to the media storage-and-forward server. The media storage-and-forward server 120 is also configured to search the corresponding merged file block according to the content-on-demand command, read the selected content from the corresponding storage location in the merged file block, and transmit a corresponding media code stream to implement content-on-demand.

Figure 6:
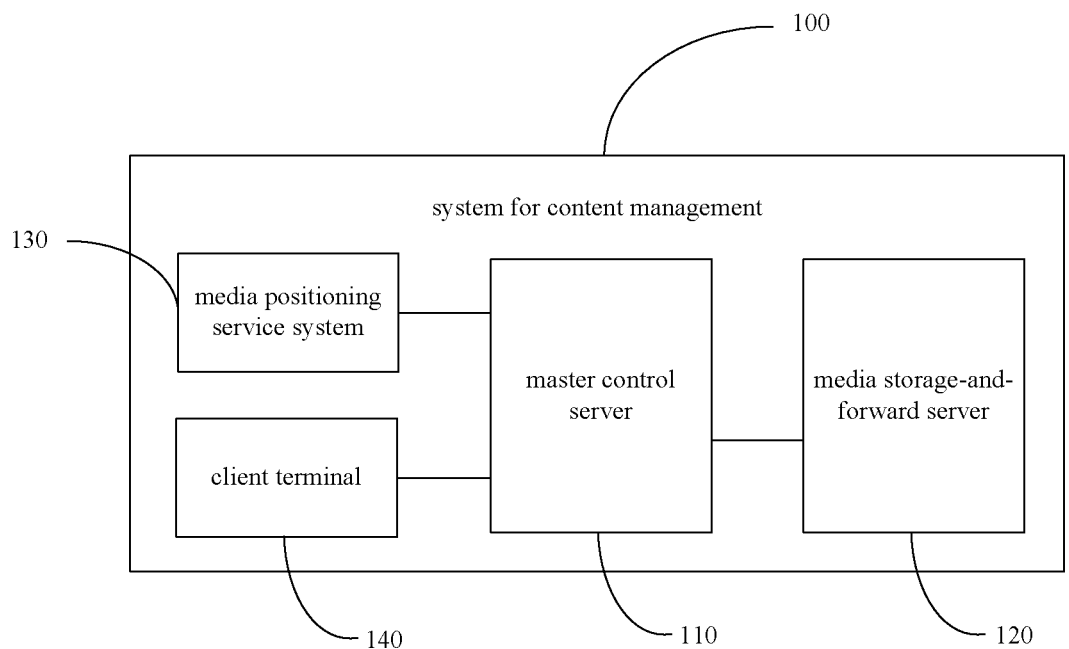
FIG. 6 is a structural diagram of a system for content management according to another embodiment of the disclosure.

As shown in FIG. 6, the system 100 for content management further includes a client terminal 140. The client terminal 140 is configured to transmit the content-on-demand request to the master control server 110. That is, the content-on-demand request is sent by the user terminal. In the embodiment, when the user needs to broadcast some content, the content-on-demand request is input through the human-computer interaction interface of the client terminal 140, and the client terminal 140, after receiving the content-on-demand request, transmits the content-on-demand request to the master control server 110.

In the embodiment of the system 100 for content management above, a plurality of small capacity contents are respectively stored in different positions of the corresponding merged file blocks in the file system storage component 121, thus saving the storage space of the file system, improving the storage efficiency of the file system, and reducing the storage cost of the file system.

It needs to be noted that above description is only to illustrate the example embodiments of the disclosure but not limit the scope of the disclosure. All equivalent structures or equivalent flow transformations made according to the description and accompanying drawings of the disclosure are directly or indirectly used in other relevant technical fields, and similarly included within the scope of patent protection of the disclosure.

What is claimed is:

1. A method for content management, comprising:
a master control server allocating, for contents to be issued, one or more merged file blocks and a storage location of each content in the one or more merged file blocks according to a content issue request received from a service system, and sending to a media storage-and-forward server a content download request containing one or more names of the one or more merged file blocks and the storage location of each content; and
the media storage-and-forward server downloading the contents to be issued according to the content download request, and storing each downloaded content in the corresponding storage location of the one or more merged file block;
wherein the content issue request comprises: the number of contents to be issued and a capacity size of each content, a plurality of merged file blocks are provided in the media storage-and-forward server, each merged file block may store one or more contents.

2. The method according to claim 1, wherein a plurality of merged file blocks are provided in a file system storage component of the media storage-and-forward server, and each merged file block is capable of storing one or more contents; a content management table is maintained in the master control server, and the content management table records an available storage space of each merged file block of the plurality of merged file blocks.

3. The method according to claim 2, wherein
the content issue request comprises the number of contents to be issued and a capacity size of each content;
the master control server allocating, for the contents to be issued, the one or more merged file blocks and the storage location of each content in the one or more merged file blocks according to the received content issue request comprises:
the master control server allocating, for all the contents to be issued, the one or more merged file blocks and the storage location of each content in the one or more merged file blocks according to the number of contents to be issued, the capacity size of each content, and the content management table maintained by the master control server.

4. The method according to claim 3, wherein the content download request contains an identifier of each content to be issued and a issue path of each content to be issued;
the media storage-and-forward server downloading the content to be issued according to the content download request comprises:
the media storage-and-forward server downloading each content to be issued from a target server according to the identifier and the issue path of the content to be issued in the content download request.

5. The method according to claim 1, wherein after the media storage-and-forward server stores the downloaded content in the corresponding storage location of the one or more merged file block, the method further comprises:
the master control server obtaining a name of the merged file block corresponding to a selected content and the storage location of the selected content in the merged file block according to a received content-on-demand request, and sending to the media storage-and-forward server a content-on-demand command containing the name of the merged file block and the storage location of the selected content in the merged file block; and
the media storage-and-forward server searching for the one or more merged file block according to the content-on-demand command, reading the selected content from the corresponding storage location in the merged file block, and transmitting a corresponding media code stream to implement content-on-demand.

6. A system for content management, comprising:
a master control server comprising a first hardware processor, configured to allocate, for contents to be issued, one or more merged file blocks and a storage location of each content in the one or more merged file blocks according to a content issue request received from a service system, and send to a media storage-and-forward server a content download request containing one or more names of the one or more merged file block and the storage location of each content; and
the media storage-and-forward server comprising a second hardware processor, configured to download the content to be issued according to the content download request, and store each downloaded content in the corresponding storage location of the one or more merged file block;
wherein the content issue request comprises: the number of contents to be issued and a capacity size of each content, a plurality of merged file blocks are provided in the media storage-and-forward server, each merged file block may store one or more contents.

7. The system according to claim 6, wherein the media storage-and-forward server comprises a file system storage component, a plurality of merged file blocks are provided in the file system storage component, and each merged file block is capable of storing one or more contents; a content management table is maintained in the master control server and the content management table is configured to record an available storage space of each merged file block of the plurality of merged file blocks.

8. The system according to claim 7, wherein the content issue request comprises the number of contents to be issued and a capacity size of each content;
the master control server, further configured to allocate, for the contents to be issued, the one or more merged file blocks and the storage location of each content in the one or more merged file blocks according to the number of contents to be issued, the capacity size of each content, and the content management table maintained by the master control server.

9. The system according to claim 8, wherein the content download request contains an identifier of each content to be issued and a issue path of each content to be issued;
the media storage-and-forward server is configured to download each content to be issued from a target server according to the identifier and the issue path of the content to be issued in the content download request.

10. The system according to claim 6, wherein the master control server, further configured to obtain a name of the merged file block corresponding to a selected content and the storage location of the selected content in the merged file block according to a received content-on-demand request, and send to the media storage-and-forward server a content-on-demand command containing the name of the merged file block and the storage location of the selected content in the merged file block; and
the media storage-and-forward server, further configured to search for the one or more merged file block according to the content-on-demand command, read the selected content from the corresponding storage location in the merged file block, and transmit a corresponding media code stream to implement content-on-demand.

\* \* \* \* \*